United States Patent Office 3,120,296
Patented Feb. 4, 1964

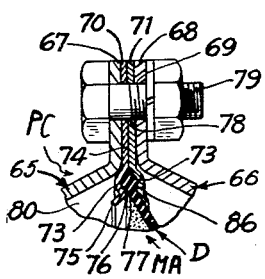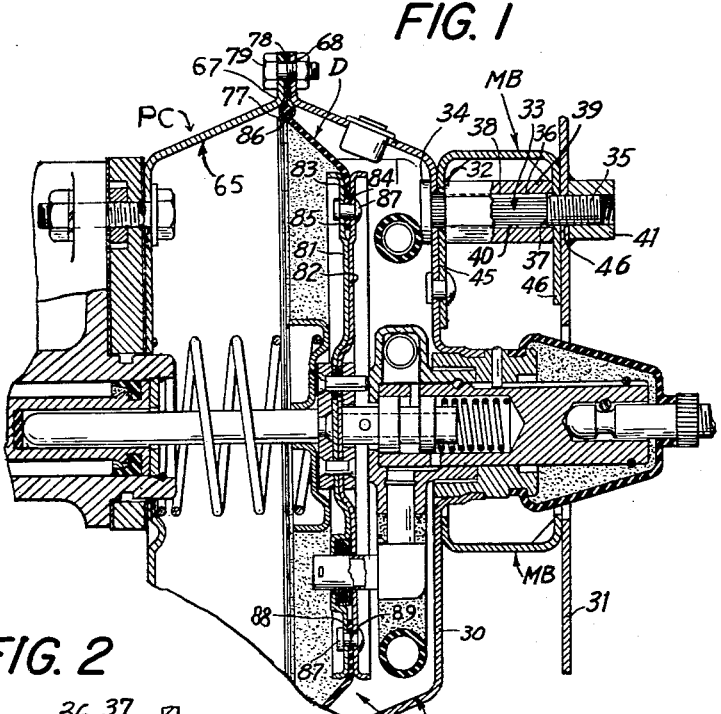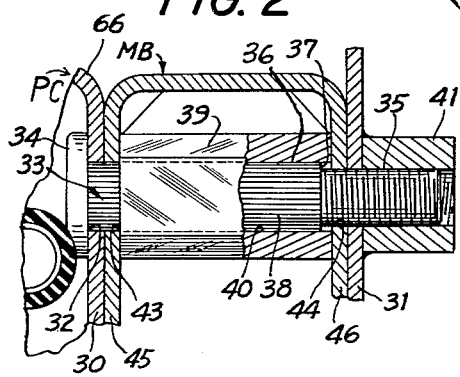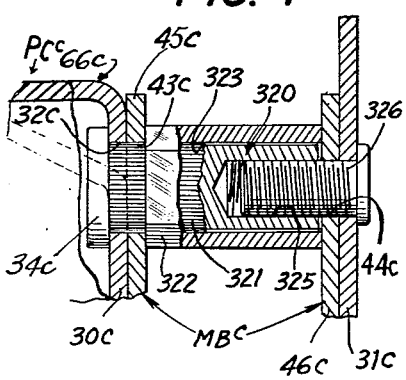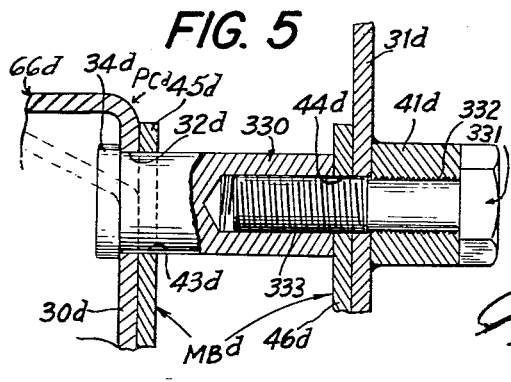

3,120,296
DETACHABLE SUPPORT MEANS FOR TWO-SECTION WALLED ENCLOSURE
Glenn T. Randol, 2nd Ave. and Pauli St., Box 275, Mountain Lake Park, Md.
Original application Sept. 19, 1957, Ser. No. 684,946. Divided and this application Jan. 12, 1962, Ser. No. 165,927
3 Claims. (Cl. 189—88)

This application is a division of my copending application Serial No. 684,946 filed September 19, 1957, now issued to Patent No. 3,101,032 dated August 20, 1963.

In my copending application referred to, I have disclosed a pressure differential operated servomotor having a two-section walled enclosure (power cylinder) with a piston-like power member movable therein under influence of said pressure differential, said power member having an outer ring-like flexible portion connected at its periphery to the interior of the power cylinder at the juncture of the said two-sections, and detachable support means are provided for the power cylinder to mount the same as a unit in its operating position on a fixed member to produce a substantially rigid unitary assembly of the cylinder and member. There are certain features of construction and operation which relate particularly to the peripheral connection of the flexible portion of the power member, and the means for detachably connecting the power cylinder to the said fixed member, thus rendering such features applicable to servomotors and the like other than the disclosed novel servomotor, and which may be utilized in operative association with activatable systems and/or devices other than those which characterize a vehicular brake system, and wherein the said detachable support means may be employed to mount such servomotors in operative position on fixed members other than the disclosed vehicle firewall. These features of the power cylinder and means for supporting the same in operating position form the subject-matter of the present application.

The present invention has for a primary objective, the provision of new and improved means for attaching the periphery of the flexible portion of a power diaphragm assembly reciprocable within a power cylinder to the latter and means for detachably mounting the power cylinder in operating position on a stationary member, especially such a member as would be associated with the component which is controlled in part or wholly by said power cylinder.

More specifically, the means for connecting the periphery of a flexible power diaphragm comprise: an outturned flange defining the open end of each of a pair of cup-like shells which in assembly produce the power cylinder, a pair of metallic rings contiguous to each other and to the confronting faces on said flanges, the inner marginal portions of the rings being formed with substantially semicircular grooves terminating at the inner edges thereof in an angular outturned flange to form an annular opening from the interior of the power cylinder into an annular channel formed between the confronting semicircular grooves in spaced relation, said annular channel being adapted to receive an annular bead defining the periphery of the flexible portion of the power-diaphragm and subject said bead to slight deformation to effect an airtight seal between the periphery of the diaphragm and the interior of the power cylinder shells substantially in juxtaposition with respect to the point of divergence of the inner ends of the shell flanges. A plurality of aligned holes is provided through the shell flanges and metallic rings through which suitable fasteners, such as the disclosed bolts with threaded nuts thereon, are inserted and drawn tightly to effect a metal-to-metal airtight connection between the rings and open flanged ends of the power cylinder shells with the added advantage accruing from this novel arrangement of insuring that the opening through the end wall of the shells are assembled in coaxial disposition so as not to bind the working parts operably projecting through these openings, and too, a fewer number of clamping bolts is required as against the larger number used where the peripheral margin of the flexible diaphragm is anchored directly between the shell flanges as commercially practiced.

Another more specific object of my invention is to produce the aforesaid new and improved means for detachably connecting the power cylinder to a fixed member (vehicle firewall) by utilizing the threaded collars on studs with which the vehicle comes equipped from the factory and which originally served to support the hydraulic brake master cylinder in operating position within the engine compartment, said means comprising an exposed tubular member disclosed herein as an elongated hex nut, the inner surface of said nut being longitudinally splined or otherwise processed for engaging a co-operating intermediate outer surface portion on a special-type head stud or internally threaded cylindrical element disclosed herein as a pin having a threaded portion for engagement with the threaded part, collar or stud as the case may be, on the vehicle firewall whereby rotation of the nut, as by an open end wrench, threads the stud or pin onto the threaded part on the vehicle and thus locks said nut between the adjacent power cylinder shell end wall and confronting face portion of the firewall to rigidly support the power cylinder in operating position. The nut having a slight pressfit with respect to its mating portion on the stud or pin to maintain the same assembled on the power cylinder shell prior to installation thereof on the vehicle. This novel arrangement for mounting the power cylinder on the firewall of the vehicle contemplates use of a cap bolt in lieu of the headed stud or pin, which can be initially threaded through the threaded collars on the vehicle firewall from the driver's side, and then into registering internally threaded bushings or collars integral with the rear end wall of the power cylinder to draw the end wall rigidly anchored to the firewall in spaced relation therefrom if such spacing is required as would be defined by the length of the pins. The cap bolts are formed with an intermediate unthreaded portion between the head and externally threaded opposite end portion, of substantially the same diameter as the diameter between the apexes of the threads in the firewall collars so that the unthreaded portion on the bolts being slightly longer than the firewall collars, will be in circular alignment with these collars and thus free of threaded engagement therewith to enable the end threads on the bolt to engage the threads in the power cylinder collars for the purpose.

Accordingly, the aforesaid novel and improved means for anchoring the periphery of the flexible power diaphragm to the interior of the power cylinder provide the advantages of a metal-to-metal flange contact of the two shells for a more rigid assembly and precision coaxial relationship therebetween as well as facilitating assembly and disassembly of the diaphragm with respect to the power cylinder; while the means for detachably mounting the power cylinder on the vehicle firewall facilitate rotation of the elongated nuts to effect such mounting, particularly where installation of the servomotor is somewhat inaccessible due to limitation of space in present-day engine compartments.

Other important objects and advantages of the present invention will be apparent to one skilled in the art from the following detailed description considered in conjunction with the accompanying drawings, in which:

FIGURE 1 is a longitudinal vertical section of a pressure differential servomotor incorporating the present invention;

FIGURE 2 is another fragmentary portion of FIGURE 1 on an enlarged scale showing details of the novel means for detachably connecting the power cylinder in operating position to a support member, such as the vehicle firewall;

FIGURE 3 is a fragmentary portion of FIGURE 1 on an enlarged scale showing details of the novel means for anchoring the periphery of the flexible portion of the power diaphragm to the interior of the power cylinder;

FIGURE 4 illustrates a modified form of the invention wherein a headed pin is substituted for the headed stud, for threaded engagement with a fixed stud in the firewall; and FIGURE 5 illustrates another modified fork of the invention wherein a headed pin is substituted for the headed stud, for threaded engagement by a cap bolt projecting from the driver's side of the firewall through threaded collars fixed to the latter.

Referring now to the drawing, and particularly FIGURES 1, 2 and 3, wherein I have disclosed the servomotor mounting and diaphragm anchoring means constituting the present invention in association with a fluid-pressure-operated servomotor disclosed herein as a vacuum-power cylinder designated as a whole by the reference character PC.

The servomotor mounting means is associated with the end wall 30 of one of the power cylinder shells 66, the latter being cup-shaped with its open end terminating in an outstanding annular flange 68. This end wall 30 of the power cylinder is preferably spaced, for example, from the forward side of a fixed member such as the forward side of the vehicle firewall 31, and is provided with a plurality, usually two or four in number, of circular openings 32 spaced from the axis of the power cylinder. A corresponding number of new and novel mounting bolts 33 having end circular flanged portions 34 and the opposite end body portions 35 externally threaded and projecting outwardly through said openings with the flanged portions contiguous to the inner marginal portions defining said wall openings 32. The threaded portion of the bolts is preferably of less diameter than an intermediate portion 36 between the threaded portion and flanged heads aforesaid to provide an external annular shoulder 37 for an importatnt purpose to appear, between the portions 35, 36. The intermediate portion of the bolts is longitudinally splined or otherwise indented at 38 on which is mounted an elongated hex-nut 39 for engagement by an open wrench to manually rotate the same, and its internal surface complementally indented at 40 for cooperation with the indents 38 on the intermediate portion whereby rotational movement imparted to the nut, as by said open wrench manually engaging its hex surface aforesaid simultaneously rotates the bolts 33 and induces relative sliding (axial) movement between the cooperating nut and bolt to clamp said nut endwise between said cylinder wall 30 and the firewall 31. The portion of the splined surface on the bolts which projects externally of the power cylinder end wall 30 is of slightly less length than the length of the nuts splined thereon so as to enable the length of the nuts when under endwise tension exerted by said wall to establish the mounting space aforesaid between the power cylinder PC and firewall 31. A corresponding number of internally threaded collars 41 is secured to the firewall as by welding in alignment with the bolts 33 and arranged in the same pattern as the openings 32. Torque manually applied to the hex-nuts slidably splined on the bolts and co-rotatable therewith, engages the threaded end portions of the bolts with their respective threaded collars on the firewall to impinge the rear wall 30 between the bolt heads and nuts and the latter between the rear wall and firewall 31 when drawn tightly to thereby rigidly secure the power cylinder PC as a unit onto the forward side of the firewall in operating position as shown in FIGURE 2. This novel arrangement of mounting the power cylinder on the vehicle utilizes the factory-installed threaded collars originally used for mounting the brake master cylinder, thus enabling installation of the power cylinder without altering factory construction with the added advantage of no special tools being required in contrast to prior art power-boosters which require alterations in the vehicle structure to effect such installations. Accordingly, the factory-installed pedal mechanism can be utilized without altering its construction in any way for mounting the servomotor PC of the present invention and with equal facility to mounting such conventional master cylinder, thereby making the present power-booster installation a highly attractive accessory item for field installation on aftermarket vehicles. To enhance the appearance and rigidity of the aforesaid novel mounting of the power cylinder PC, a pair of horizontally disposed U-shaped mounting brackets such as generally indicated at MB may be associated with the aforesaid novel mounting bolts 33, said brackets each comprising registering openings 43, 44 arranged in the same pattern as the holes 32 and collars 41, through their legs 45, 46 respectively for reception of the bolts 33 with the inner faces of the legs spaced substantially to the same length as the splined hex-nuts which span the space between said legs, so that when the bolts are tightly threaded into the firewall collars, the elongated hex-nuts are impinged firmly between the bracket legs to securely support the power cylinder PC on the firewall 31 as shown. The aforesaid brackets are secured to the outer side of the rear wall 30 of the power cylinder shell 66 as by a plurality of rivets 47 arranged in the pattern shown.

Referring now to FIGURE 3 wherein there is disclosed a fragmentary section of my novel and improved means for anchoring the outer peripheral portion of a ring-like flexible wall or diaphragm generally indicated at D comprising a part of the power assembly designated as a whole MA the latter being movably incorporated within the power cylinder PC with the periphery of the ring-like flexible portion substantially in circular alignment with the juncture of the outturned annular flanges 67, 68 defining the open confronting ends of the two complemental shells 65, 66 respectively adapted to form the aforesaid power cylinder PC as shown in FIGURE 1. The flanges 67, 68 are provided with a plurality of circumferentially spaced registering holes 69. A pair of metallic rings 70, 71 are each formed in cross section with an inner substantially semicircular portion 73 merging with an offset flat outer marginal portion 74 with the confronting sides of the latter portions contiguous, and the confronting inner angularly flanged ends 75 of the portions 73 divergently spaced to provide a circular opening 76 leading into an annular substatially circular in cross section channel 77 between the confronting semicircular portions. The flat portions of the rings are provided with holes 78 registering with the holes 69 in the shell flanges aforesaid for reception of cap bolts 79, for example, with nuts threaded thereon to clamp the two shells 65, 66 and metallic rings in a rigid metal-to-metal unitary assembly with the channel 77 lying adjacent to and between the inner marginal portions of the outturned flanges 67, 68 for an important purpose to appear.

The aforesaid power assembly MA comprises a metallic central portion consisting of a pair of juxtapositioned plates 81, 82 mounted back-to-back with their peripheral marginal wall portions offset outwardly at 83 to form an external annular channel 84 therebetween for reception of the inner marginal portion 85 of the flexible diaphragm D, the outer periphery of said diaphragm being defined by a circular ridge or bead 86 in cross section which engages the annular channel 77 to anchor the diaphragm to the inner side of the power cylinder PC at the diverging juncture of the shell flanges 67, 68 in airtight sealed relation thereto, it being particularly noted that when the two metallic rings are assembled between the shell flanges 67, 68 and the clamping bolts 79 drawn tightly, that the semicircular portions on the metallic rings impose compression on the diaphragm bead to insure its being airtight and securely anchored to prevent pressure loss between the flanges 67, 68 and metallic rings, and to isolate the fluid pressure chambers 62, 80 on opposite sides of the power-diaphragm MA from each other to enable pressure differential to move said power-diaphragm during activated status of the servomotor. A plurality of fasteners such as rivets 87 projecting through aligned holes 88, 89 in the plates 81, 82 to effect unitary airtight assembly of these plates and the inner marginal portion 85 of the diaphragm D. Accordingly, I have provided a simple and effective means for attaching the outer periphery of the flexible portion of a power-diaphragm to the inner side of the power cylinder in airtight sealed relation thereto, plus the advantages of metal-to-metal unitary assembly of the two shells comprising the power cylinder, thereby preventing angular distortions in the power unit PC when actuating forces are effective thereagainst, both internally from the pressure differential and externally from operator force exerted on the working parts during "straight-through" operation of the brake master cylinder in cooperation with the servomotor or independently thereof should power failure occur. A further advantage is provided in the assembly and disassembly of the power cylinder which are greatly facilitated due to the periphery of the flexible diaphragm not requiring a definite location with respect to the mating metallic clamping rings and the shell flanges 67, 68 with the assurance the assembly is airtight and lowering the cost of producing the diaphragm as well. In the event replacement of the flexible portion of the power assembly MA is necessary, this operation can be efficiently carried out by any service station attendant or garage mechanic without special tools or training.

In the case of my novel detachable means for mounting the power cylinder PC on the vehicle firewall 31, this operation may be carried out with ease by simply applying an open-end wrench to the elongated hex-nuts and rotating the same in the proper direction according to the operation involved, that is, removing the unit for servicing or installing the same on the vehicle. It should be particularly noted that the brackets MB add rigidity and enhance the appearance to the mounting of the power unit on the firewall but are not essential to installing such a power unit, since the disclosed elongated hex-nuts and cooperating parts may be produced in such size as to carry the full weight and operating thrusts on the power unit by impinging the hex-nuts between the end wall 30 of the shell 66 and the confronting face portion on the vehicle firewall 31 rather than clamping said nuts between the legs 45, 46 of the pair of brackets as shown in FIGURE 1, but in either case the nuts are accessible nothwithstanding the power unit may have to be installed in close quarters within the engine compartments of present-day motor vehicles and the like.

*First Modified Support Structure for Power Cylinder*

(FIGURE 4)

This modified mounting structure for the power cylinder PC utilizes an elongated pin 320 having a shouldered end or head in lieu of the threaded cap bolt 33 described in connection with the main embodiment, and parts similar to those already described are designated by like reference characters distinguished, however, by suffix "c," said pin having its intermediate portion external to the power cylinder end wall 30c longitudinally splined or otherwise indented at 321 on which is mounted a sleeve 322 having its exterior surface formed with a plurality of interconnected flat surfaces, as for example of hexagonal configuration for engagement by an open end wrench for manually rotating the same therefore the pin aforesaid through the splined connection therewith. The internal surface of the sleeve is formed with complemental indentations 323 for cooperating with the indents 321 on the intermediate portion of the pin 320 whereby rotational movement imparted to the sleeve 322, simultaneously rotates the head pin 320 and induces relative sliding (axial) movement between the pin and sleeve. The portion of the splined surface of the pin 320 which projects externally of the power cylinder end wall 30c is of less length than the length of the sleeve 322 so as to enable said sleeve to be longitudinally impinged between the wall 30c and firewall 31c of the motor vehicle in response to engaging an internally threaded axial bore 325, with a complementally externally threaded stud 326 rigid with and projecting forward of the firewall whereby the power unit PC$^c$ is rigidly secured to the forward side of the firewall in predetermined spaced relation thereto as defined by the length of the sleeve 322 impinged therebetween as a result of threading the pins 320 into tightly threaded engagement with the aforesaid studs to impinge the end of the pin adjacent the firewall thereagainst.

This arrangement differs from the hex-nut and bolt structure of the first embodiment by substituting an internally threaded pin for the externally threaded bolt 33 to enable mounting the present power unit on vehicles which come equipped with externally threaded studs welded at the headed end to the firewall instead of internally threaded collars originally used for supporting the suspended-pedal operated master cylinder in operating position on the forward side of the firewall.

*Second Modified Support Structure for Power Cylinder*

(FIGURE 5)

This modification discloses a new and novel means for supporting the power cylinder unit PC on the forward side of the vehicle firewall by utilizing the threaded collars 41 of the first embodiment (FIGURES 1 and 2), and parts similar to those already described are designated by like reference characters distinguished, however, by suffix "d," and no alterations in the structure are required in the immediate area in which the brake master cylinder was originally mounted. This new arrangement is quite simple and comprises: a plurality of pins 330 axially bored a predetermined depth toward the headed end and fixed as by welding to the end wall 30d of the power cylinder PC$^d$ at that end in the same spaced relation as the internally threaded collars 41d on the firewall. A corresponding number of cap bolts 331 having an intermediate smooth body portion 332 of the same diameter as the minor diameter of the threaded portion through the collars 41d are threaded through said collars from the driver side of the firewall 31d to present the smooth body portion of the bolts in circular alignment with the length of the collars to negate further relative threading movement of the bolts with respect to the collars 41d, and engage the threaded end portions of the bolts into threaded engagement with complementally threaded portions defining the axial bores in the pins 330 until the opposite end walls of the pins 330 are drawn tightly into engagement with the confronting surface portion on the firewall, or a spacer member (brackets MB$^d$) inserted between the power cylinder end wall and firewall to improve the appearance of and additionally stabilize the power unit PC$^d$ on the firewall as is understood.

The latter mounting arrangement lends itself readily to vehicles and the like equipped with threaded bushings rigid with the firewall and originally used to receive the master cylinder mounting bolts, as the standard cap bolts require only slight alteration to incorporate the smooth body portion intermediate the head 34d and threaded end portions to secure the power unit in operating position. It is obvious from the disclosure in the first embodiment that the spacer member (elongated hex-nut or sleeve) may be adapted to span the space between the legs 45d, 46d of the bracket means MB as defined by the coaxial holes 43, 44 respectively in the case such means are associated with the pins 330.

From the foregoing description, considered with the various illustrations of the different embodiments of my invention, it will be seen that certain interrelated components of the power unit mounting means shown in FIGURES 2, 4 and 5 possess similar functional characteristics such that interchangeability is readily effected, particularly in connection with the elongated hex-nut or sleeve to mount the power unit in operating position as exemplarily depicted on the firewall of a motor vehicle and the like.

Moreover, the different mounting structures shown in FIGURES 2, 4 and 5 provide a wide range of methods for installing a brake booster unit in operating position without the need of altering the vehicle structure originally employed for supporting the conventional firewall mounted brake master cylinder.

Although the different embodiments of my invention disclosed herein are believed well calculated to fulfill the objects stated, it will be appreciated that I do not wish to be limited to the exact construction and/or arrangement of the parts shown, since it is evident that modifications, variations and substitutions may be made therein without departing from the proper scope or fair meaning of the subjoined claims.

Having thus described my invention, I claim:

1. In detachable means for supporting one end of a walled enclosure on a spaced fixed member having a plurality of threaded holes therein, the improvement which comprises: a U-shaped member having a pair of spaced legs in contact with said end wall and said fixed member respectively, said legs being interconnected at one end by a segment; a like-number of holes through said legs, and which are arranged in the same pattern as the aforesaid threaded holes; means for fixing the leg contiguous to said end wall thereto; a like-number of holes through said end wall in alignment with said threaded holes and holes through said legs; a like-number of bolts headed at one end and having a normal body portion and a terminating reduced diameter externally threaded portion, to provide an external annular shoulder therebetween, said bolts being adapted to project through said aligned holes aforesaid into threaded engagement with said threaded holes; a like-number of rotatable sleeves spanning the space between said legs, and which receive the normal body portions respectively of said bolts; an indentation defining a portion of the body portion of the normal body portions of said bolts; a complemental indentation within each of said sleeves, and which is adapted to cooperate with the indentations on the bolts whereby the cooperating sleeves and bolts rotate as a unit and axially adjust relatively; and manually-operable means for rotating said sleeves individually to engage the threaded portion on their respective bolts with said threaded holes until said sleeves are impinged endwise between said legs to produce a unitary assembly of the enclosure, bolts, sleeves and fixed member.

2. In detachable means for supporting one end of a walled enclosure on a spaced fixed member having a plurality of threaded studs projecting therethrough toward said walled enclosure, the improvement which comprises: a U-shaped member having a pair of spaced legs in contact with said end wall and said fixed member respectively, said legs being interconnected at one end by a segment; a like-number of holes through said legs, and which are arranged in the same pattern as the aforesaid threaded studs; means for fixing the leg contiguous to said end wall thereto; a like-number of holes through the end wall of said enclosure in alignment with said holes through said legs and said threaded studs; a like-number of sleeves spanning the space between said legs in coaxial relation to said aligned holes, said sleeves being formed interiorly with longitudinal splines; a like-number of cylindrical pins having one end contiguous to the holes in the end wall of said enclosure and a body portion complementally splined and which projects through said aligned holes in said end wall of said enclosure and said leg fixed thereto into engagement with the splines in said sleeves whereby rotational movement of the sleeves imparts co-rotational movement to their cooperating pins; a blind threaded bore extending axially a predetermined depth into the body portion of said pins; and manually-operable means for imparting rotational movement to said sleeves individually and thereby rotate their respective cooperating pins into threaded engagement with their respective threaded studs on the fixed member until the sleeves are impinged endwise between the said legs to produce a unitary assembly of said enclosure, pins, sleeves and fixed member.

3. In detachable means for supporting one end of a walled enclosure on a spaced fixed member having a plurality of threaded holes therein, the improvement which comprises: a U-shaped member having a pair of spaced legs in contact with said end wall of said enclosure and said fixed member respectively, said legs being interconnected at one end by a segment; a like-number of aligned holes through said legs, and which are arranged in the same pattern as the aforesaid threaded holes; means for fixing the leg contiguous to said end wall thereto; a like-number of holes through said end wall in alignment with said holes through said legs and said threaded holes, with the holes through said end wall and leg fixed thereto being of larger diameter than each aligned pair of holes through said legs and fixed member; a like-number of cylindrical pins having one end flanged and fixed to said end wall with their body portions projecting through the aligned holes therein and said leg fixed thereto to span the space between said legs in coaxial relation to said aligned holes; a blind threaded bore extending axially a predetermined depth into the body portion of said pins; a like-number of headed end bolts having a terminating externally threaded body portion and an intermediate smooth diameter portion of substantially the same diameter as the minor diameter of said threaded holes in the fixed member whereby said threaded portions of the bolts are first threaded through their respective threaded holes in said fixed member, thence into their threaded blind bores in said pins until the smooth (unthreaded) body portion of said bolts is in circular (disengaged) alignment with their respective threaded holes in the fixed member to disengage the threaded engagement therebetween and thereby enable the threaded portions on the bolts to threadedly engage said blind bores in said pins to effect endwise impingement of the ends of said pins opposite their headed ends against the leg of the U-shaped member in contact with said fixed member to produce a unitary assembly of the enclosure, pins, bolts and fixed member; and means for manually rotating said bolts individually.

References Cited in the file of this patent

UNITED STATES PATENTS

| | | |
|---|---|---|
| 2,517,745 | Weatherhead | Aug. 8, 1950 |
| 2,638,931 | Barr | May 19, 1953 |
| 2,645,317 | Staff | July 14, 1953 |
| 2,661,767 | Lamb | Dec. 8, 1953 |
| 2,672,107 | Widman | Mar. 16, 1954 |